United States Patent
Qama et al.

(10) Patent No.: US 11,609,082 B2
(45) Date of Patent: Mar. 21, 2023

(54) CALIBRATION AND LINEARIZATION OF POSITION SENSOR

(71) Applicant: Integrated Device Technology, Inc., San Jose, CA (US)

(72) Inventors: Gentjan Qama, Munich (DE); Peter Kiesel, Kornwestheim (DE)

(73) Assignee: INTEGRATED DEVICE TECHNOLOGY, INC., San Jose, CA (US)

( * ) Notice: Subject to any disclaimer, the term of this patent is extended or adjusted under 35 U.S.C. 154(b) by 477 days.

(21) Appl. No.: 16/575,004

(22) Filed: Sep. 18, 2019

(65) Prior Publication Data

US 2020/0096309 A1     Mar. 26, 2020

Related U.S. Application Data

(60) Provisional application No. 62/734,762, filed on Sep. 21, 2018.

(51) Int. Cl.
*G01B 7/00* (2006.01)
*G01B 7/30* (2006.01)
*G01D 5/20* (2006.01)

(52) U.S. Cl.
CPC ............ *G01B 7/30* (2013.01); *G01B 7/003* (2013.01); *G01D 5/2006* (2013.01)

(58) Field of Classification Search
CPC ........ G01B 7/30; G01B 7/003; G01D 18/008; G01D 5/2006; G01D 5/2053
See application file for complete search history.

(56) References Cited

U.S. PATENT DOCUMENTS

| 5,251,631 | A | * | 10/1993 | Tsuchiko | ................ A61B 8/00 600/447 |
| 5,396,241 | A |   | 3/1995  | Ames et al. | |
| 5,689,203 | A | * | 11/1997 | Geist | .................... G01D 18/008 324/130 |
| 2016/0349084 | A1 | * | 12/2016 | Gerardiere | ........... G01D 5/2448 |
| 2017/0146256 | A1 | * | 5/2017  | Alexander | ............... G05B 1/00 |

FOREIGN PATENT DOCUMENTS

| EP | 3232164 A1 * | 10/2017 | ........... G01D 18/008 |
| EP | 3232164 A1   | 10/2017 | |
| WO | WO-2019014690 A1 * | 1/2019 | ........... G01D 5/2046 |

OTHER PUBLICATIONS

European Communication and Extended European Search Report from European Patent Application No. 19198753.6, dated Feb. 13, 2020, pp. 1-6.

* cited by examiner

*Primary Examiner* — Natalie Huls
*Assistant Examiner* — James I Burris
(74) *Attorney, Agent, or Firm* — Haynes and Boone, LLP (57) ABSTRACT

In some embodiments, a position sensor calibration and linearization system for position sensors is provided. A method of calibrating and linearization of a position sensor includes reading Spatial Angle data from a position sensor at a set of positions of a target swept over receive coils in the position sensor; calculating calibration parameters from the Spatial Angle data; determining an initial position values from the Spatial Angle data and the calibration parameters; determining linearization parameters from the initial position values; and writing the calibration parameters and the linearization parameters into the position sensor.

11 Claims, 10 Drawing Sheets

CALIBRATION AND LINEARIZATION OF POSITION SENSOR

RELATED APPLICATION

This disclosure claims priority to U.S. Provisional Application 62/734,762, filed on Sep. 21, 2018, which is herein incorporated by reference in its entirety.

TECHNICAL FIELD

Embodiments of the present invention are related to position sensors and, in particular, to improvements on calibration and linearization of position sensors.

DISCUSSION OF RELATED ART

Position sensors are used in various settings for measuring the position of one component with respect to another. Inductive position sensors can be used in automotive, industrial and consumer applications for absolute rotary and linear motion sensing. In many inductive positioning sensing systems, a transmit coil is used to induce eddy currents in a metallic target that is sliding or rotating above a set of receiver coils. Receiver coils receive the magnetic field generated from eddy currents and the transmit coils and provide signals to a processor. The processor uses the signals from the receiver coils to determine the position of the metallic target above the set of coils. The processor, transmitter, and receiver coils may all be positioned on a printed circuit board (PCB).

However, these systems exhibit inaccuracies for many reasons. For example, the electromagnetic field generated by the transmitter, and the resulting fields generated in the metallic target, may be non-uniform, the connections of wire traces to the transmit coils and the arrangement of receive coils may result in further non-uniformity. The air-gap (AG) between the metallic target and the coils mounted on the PCB may be non-uniform. Further, the amplitudes of signals generated by receiver coils may have an offset. There may be mismatches between the multiple receiver coils. There may be different coupling effects between the metallic target and each of the multiple receiver coils. These and other factors may result in inaccurate results of the position locating system.

Therefore, there is a need to develop better methods of designing sensor coils that offer better accuracy for position sensing and better calibration systems to correct for inaccuracies.

SUMMARY

In some embodiments, a position sensor calibration and linearization system for position sensors is provided. A method of calibrating and linearization of a position sensor includes reading Spatial Angle data from a position sensor at a set of positions of a target swept over receive coils in the position sensor; calculating calibration parameters from the Spatial Angle data; determining an initial position values from the Spatial Angle data and the calibration parameters; determining linearization parameters from the initial position values; and writing the calibration parameters and the linearization parameters into the position sensor.

A calibration and linearization system according to some embodiments includes a processor; and a position motor coupled to the processor, the position sensor configured to move a target mounted to the position motors over a range of a position sensor positioned relative to the target. The processor executes instructions to read Spatial Angle data from the position sensor at a set of positions of a target swept over receive coils in the position sensor; calculate calibration parameters from the Spatial Angle data; determining initial position values from the Spatial Angle data and the calibration parameters; determine linearization parameters from the initial position values; and write the calibration parameters and the linearization parameters into the position sensor.

These and other embodiments are discussed below with respect to the following figures.

These and other aspects of embodiments of the present invention are further discussed below.

DETAILED DESCRIPTION

In the following description, specific details are set forth describing some embodiments of the present invention. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure.

This description illustrates inventive aspects and embodiments should not be taken as limiting—the claims define the protected invention. Various changes may be made without departing from the spirit and scope of this description and the claims. In some instances, well-known structures and techniques have not been shown or described in detail in order not to obscure the invention.

In accordance with embodiments of the present invention, methods of calibrating and linearizing a position sensor is presented. This method includes measuring spatial angle data as a target is swept over the receive coils in the position sensor and calculating calibration parameters from the spatial angle data. Further, position values can be determined and a linearization correction can be performed. In some embodiments, determining the position value includes measuring the position value. In some embodiments, the position value includes calculating the position value from the spatial angle data and the calibration parameters.

Figure 1A:
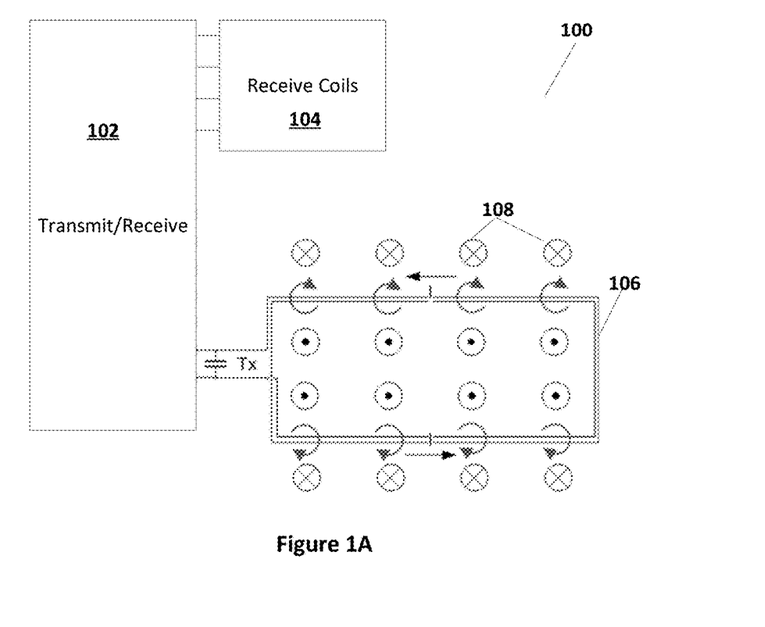
FIGS. 1A and 1B illustrates a coil system for determining a position of a target.
Figure 1B:
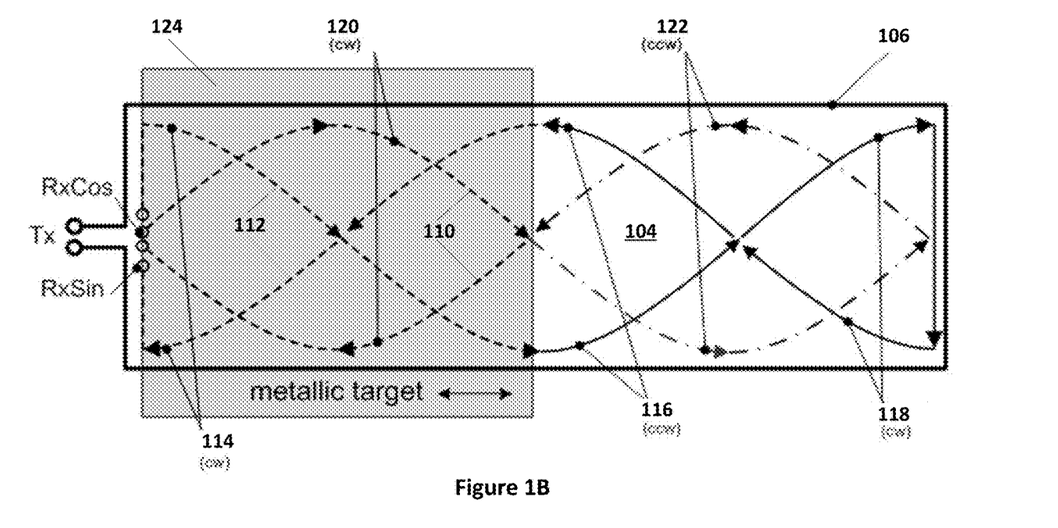

FIG. 1A illustrates a positioning system 100. Although FIGS. 1A and 1B illustrate operation of a linear position sensor, rotational position sensors are operationally the same. As illustrated in FIG. 1A, the positioning system includes transmit/receive control circuit 102 that is coupled to drive a transmitter coil 106 and receive signals from receiver coils 104. In most configurations, receiver coils 104 are located within transmitter coil 106, however in FIG. 1A they are illustrated separately for clarification purposes. Receiver coils 104 are generally physically located within the border of transmit coil 106. Embodiments of the present invention can include a transmitter coil 106, two receiver coils 104, and an integrated circuit (IC) 102 driving the transmitter coil 106 and measuring the signals originated in the receiver coils 104 all formed on a printed circuit board (PCB).

FIG. 1B illustrates a configuration of transmit coils 106 and receive coils 104 in a linear position locating system. As is shown in FIG. 1B, a conductive metallic target 124 can be positioned over the transmitter coil and the two receiver coils.

As is illustrated in FIG. 1A, transmit coil 106 is driven to form magnetic field 108. Transmit coil 106 can be driven at a range of frequencies or at particular frequencies. In FIG. 1A, magnetic field 108, with the positive current illustrated by the arrows, is circular around each wire and in a direction that points out of the page inside coil 106 and into the page outside of coil 106 with the current direction as illustrated in FIG. 1A. Receive coils 104 are located inside coil 106, as is illustrated in FIG. 1B. Transmit coil 106 is driven at any frequency that can produce magnetic field 108 to induce voltages in receiver coils 104. In general, there can be any number of receiver coils, however, for ease of discussion, a system with two receiver coils is discussed below.

FIG. 1B illustrates the arrangement of sensor receive coils (RX) 104 within transmit coil (TX) 106 for a linear position sensor. However, it is understood that embodiments of the present invention are applicable to any geometry of position sensor. As illustrated in FIG. 1B, sensor receive coils 104 includes a sine-wave oriented coil RX SIN 112 and a cosine-oriented signal coil RX COS 110. Sine-wave oriented coil RX SIN 112 includes sine loops 114, 116, and 118 where coil 112 is wound in in-phase or anti-phase directions, here depicted as clockwise or counter clockwise depictions, to result in the production of voltages in the loop of opposite sign as a result of the presence of electro-magnetic field 108. As is illustrated, the wiring of sine-wave oriented coil 112 provides a clockwise rotation in loops 114 and 118 resulting in a nominally positive voltage and a counterclockwise rotation in loop 116 resulting in nominally negative voltages. Similarly, cosine-oriented coil 110 may include a first loop 120 with a clockwise orientation and a second loop 122 with a counterclockwise orientation. FIG. 1B illustrates a possible electromotive force reference direction, as indicated by the arrows, that is consistent with the magnetic fields produced by transmit coil 106 as illustrated in FIG. 1A.

In the system illustrated in FIG. 1B, the transmitter coil (TX) 106 is stimulated by the transmit/receive circuit 102, which may be an integrated circuit, to generate a variable Electromagnetic field (EMF), illustrated as magnetic field 108. The magnetic field 108 couples with the receiver coils (RX) 104. If a conductive metallic target 124 is placed on the top of the receiver coils 104 as illustrated in FIG. 1B, an eddy current is generated in the metallic target 124. This eddy current generates a new electromagnetic field that is ideally equal and opposite of field 108, canceling the field in receiver coils 104 directly under metallic target 124. The receiver coils (RX) 104 capture the variable EMF field 108 generated by the transmit coils 106 and those induced by metallic target 124, resulting in sinusoidal voltages generated at the terminals of receiver coils 104.

In absence of metallic target 124, there will be no voltage at the terminals of the RX coils 104 (labeled Rx COS 110 and RX Sin 112 in FIG. 1B). When metallic target 124 is placed in a specific position with respect to the RX coils 104, the resultant electromagnetic field on the area covered by the metallic target 124 is ideally zero and therefore the voltages at the terminals of the RX coils 104 will have different characteristic depending on the location of metallic target 124 relative to receiver coils 104. The RX coils 104 are designed in a way that a sine voltage is created at the terminals of one RX coil (Rx Sin 112) and a cosine voltage is created at the terminals of the other RX coil (Rx Cos 110) as metallic target 124 is swept across receiver coils 104. The position of the target with respect to the RX coils 104 modulates the amplitude and the phase of the voltage at the terminals of the RX coils 104.

As illustrated in FIG. 1A and discussed above, transmitter coil 106, receive coils 104, and transmit/receive circuit 102 can be mounted on a single PCB. Further, the PCB can be positioned such that metallic target 124 is positioned above receive coils 104 and spaced from receive coils 104 by an air gap (AG). The position of metallic target 124 relative to the PCB on which receive coils 104 and transmitter coil 106 is mounted can be determined by processing the signals generated by sine-oriented coil 112 and cosine-oriented coil 110. Below, the determination of the position of metallic target 124 with respect to receive coils 104 is described in a theoretical ideal condition.

In FIG. 1B, metallic target 124 is located at a first location. In this example, FIG. 1B and depicts operation of a linear position locator system. The principle of operation is the same in both linear and circular locators. In the discussion below, the position is given in relation to the construction of cosine-oriented coil 110 and sine-oriented coil 112 by providing the angular relations with respect to the sine operation of sine-oriented coil 112 which results from the position of the leading edge of metallic target 124 and coils 110 and 112. The actual position of metallic target 124 in such a system can be derived from the angular position as measured by the output voltages of receive coils 104 and the topology of receive coils 110 and 112. Furthermore, as illustrated in FIG. 1B, the topology of coil 110 and the topology of coil 112 are coordinated to provide indication of the location of metallic target 124 relative to the receive coils 104.

FIGS. 2A through 2I illustrate operation of the position sensor illustrated in FIGS. 1A and 1B with target 124 positioned at 0°, 90°, and 180°, respectively (the angular positions corresponding to linear positions of target 124 relative to the receive coils 110 and 112). The transmitter coil (TX) 106 is stimulated be the transmit/receive circuit 102, formed on an IC to generate a variable Electromagnetic field (EMF1). Such magnetic field couples with the receive coils 110 and 112. The receive coils (RX) 110 and 112 capture the variable EMF and a sinusoidal voltage is generated at the terminals of the receive coils 110 and 112.

If a conductive target 124 is placed on the top of the coil receivers 110 and 112, an eddy current is generated on the surface of the target 124 by the EMF1 field generated by transmit coils 106. This Eddy current generates a new EMF2 that is opposite of the EMF1 but ideally with the same intensity.

In absence of target 124, there will be no voltage at the terminals of the RX coils 110 and 112. When the target 124 is placed in a specific position with respect to the RX coils 110 and 112, the resultant EM on the area covered by the target is ideally zero and therefore the voltages at the terminals of the RX coils 110 and 112 will have different characteristic. The RX coils 110 and 112 are designed in a way that a sine voltage as a function of position of target 124 is created at the terminals of one RX coil 112 and a cosine voltage as a function of position of target 124 is created at the terminals of the other RX coil 110. The position of the target 124 with respect to the RX coils 110 and 112 modulates the amplitude and the phase of the voltage at the terminals of the RX coils 110 and 112. This is illustrated in FIGS. 2A through 2I.

FIGS. 2A through 2I illustrate sweeping the target from a defined initial position to a define end position by illustrating operation of the receive coils for positions of target 124 corresponding to 0°, 90°, and 180°. The output of the receive coils 110 and 112 will be a sinusoidal voltage (V sin) from receive coil 112 and cosinusoidal voltage (V cos) on receive coil 110 depending on the position of target 124. The position of the target can the be calculated from the arc tan (V sin/V cosin). It is important to notice the following general properties about the coils in a position sensor: (1) The shape of transmitter coil 106 has no importance as long as it covers the area where the receiver coils 104 are placed; (2) The shape of the receiver coils 104 is arranged to a geometrical sine and cosine that is overlapped; and (3) The shape of target 124 has no influence on the working principle as long as the area of target 124 covers a part of the total area of receiver coils 104.

Figure 2A:
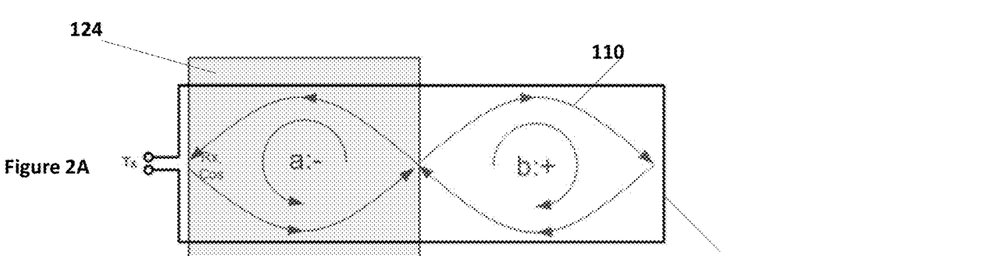
FIGS. 2A, 2B, and 2C illustrate operation of the position sensor illustrated in FIGS. 1A and 1B with a target position at 0°.
Figures 2B, 2C:
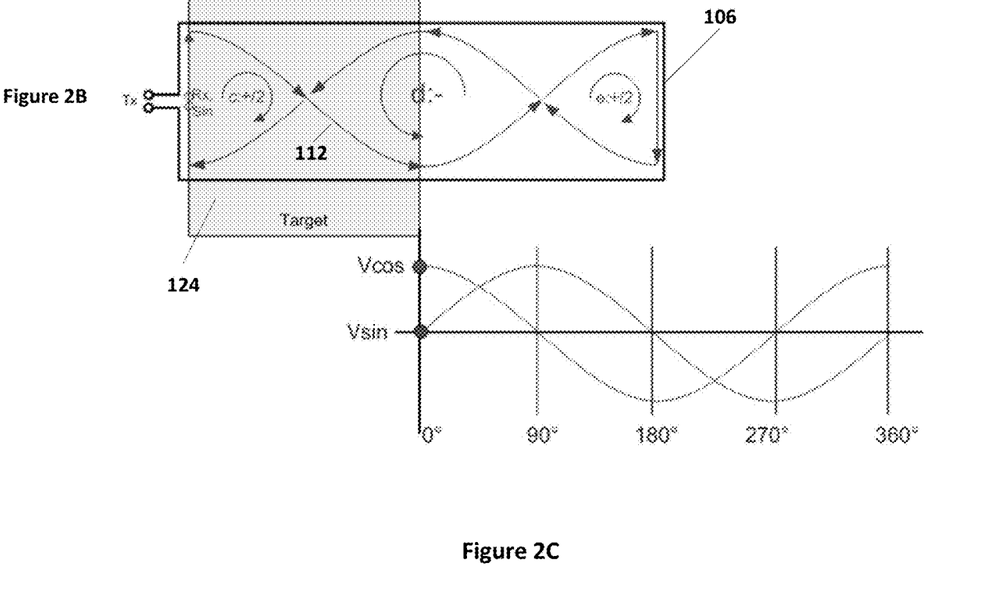

FIGS. 2A, 2B, and 2C illustrates operation where target 124 is positioned in the 0° position. FIG. 2A illustrates operation of cosine receive coil 110. As is illustrated, cosine receive coil 110 includes an a loop and a b loop. As is illustrated, a loop is completely covered by target 124 and therefore contributes 0 units of voltage ($V_a=0$) while loop b is uncovered and contributes 1 unit of voltage ($V_b=0$). Consequently, the cosine voltage is given by $V_{cos}=V_a+V_b=1$. The units of voltage are relative and scalable to an actual voltage that is received from receive coils 104 (the combination of receive coils 110 and 112). FIG. 2B illustrates the corresponding situation with the sine coil 112, which as is illustrates includes loops c, d, and e. Loop d is complete in the center of coil 112 while loop c is to the left of loop d and while loop e is to the right of loop c. As is illustrated, loop c and half of loop d is covered by target 124 while the other half of loop d and loop e is uncovered by target 124. Consequently, the voltage contributions from loops c, d, and e is given by $V_c=0$, $V_d=-½$, and $V_e=+½$. The sign of the contribution is depending on the indicated direction (clockwise or counterclockwise) of the induced current. Consequently, the sine voltage $V_{sin}$ is given by $V_c+V_d+V_e=0$. FIG. 2C illustrates the sin voltage $V_{sin}$ from receive coil 112 and cosine voltage $V_{cos}$ from receive coil 110 as a function of target position (given in angular terms). FIG. 2C shows the voltages $V_{sin}$ and $V_{cos}$ resulting from the arrangement illustrated in FIGS. 2A and 2B.

Figure 2D:
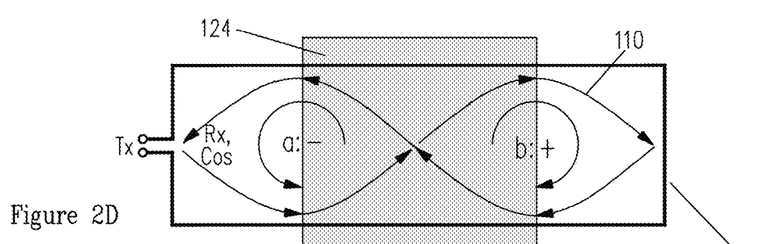
FIGS. 2D, 2E, and 2F illustrates operation of the position sensor illustrated in FIGS. 1A and 1B with a target position at 90°.
Figure 2E:
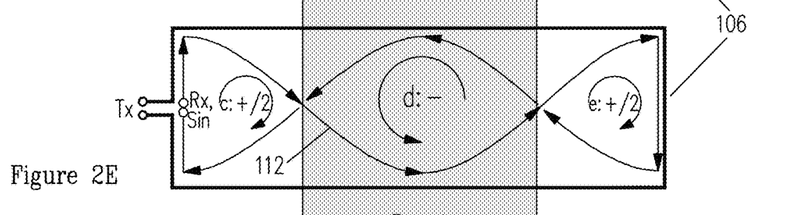
Figure 2F:
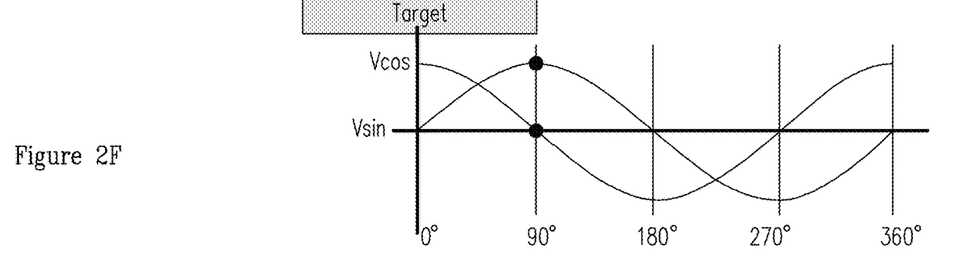

FIGS. 2D, 2E, and 2F illustrate operation of receive coils 110 and 112 with target 124 positioned at the 90° position. As shown in FIG. 2D, loop a and loop b of receive coil 110 are each ½ covered. Considering the shown currents in the loops, $V_a=-½$ and $V_b=+½$. Consequently, $V_{cos}=V_a+V_b=0$. FIG. 2E illustrates loops c, d, and e where loop d is covered by target 124 while loops c and e are uncovered by target 124. Consequently, considering the shown currents in the loops, $V_c=½$, $V_d=0$, and $V_e=½$. Consequently, $V_{sin}=V_c+V_d+V_e=1$. This is further illustrated in the graph of $V_{sin}$ and $V_{cos}$ as a function of the position of target 124 illustrated in FIG. 2F.

Figure 2G:
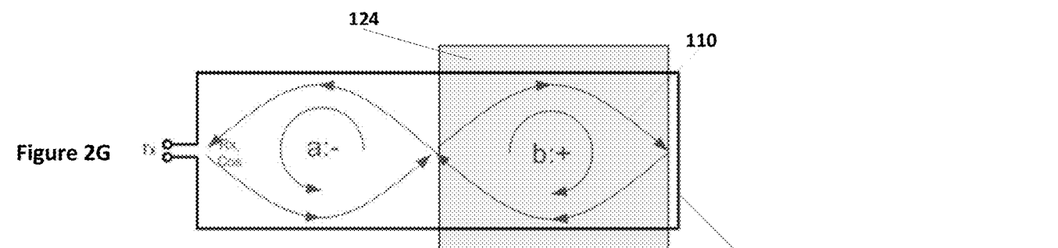
FIGS. 2G, 2H, and 2I illustrates operation of the position sensor illustrated in FIGS. 1A and 1B at 180°.
Figure 2H:
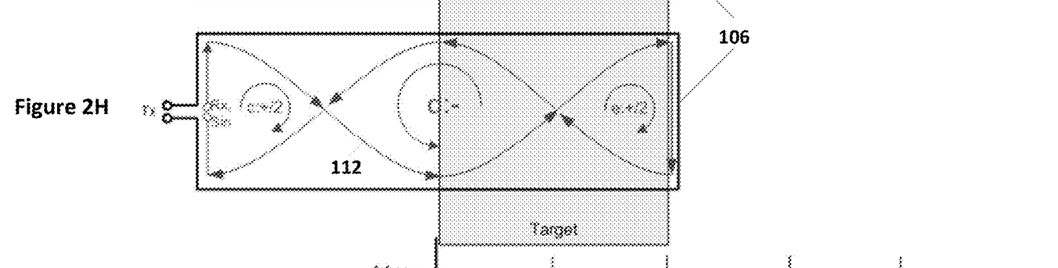
Figure 2I:
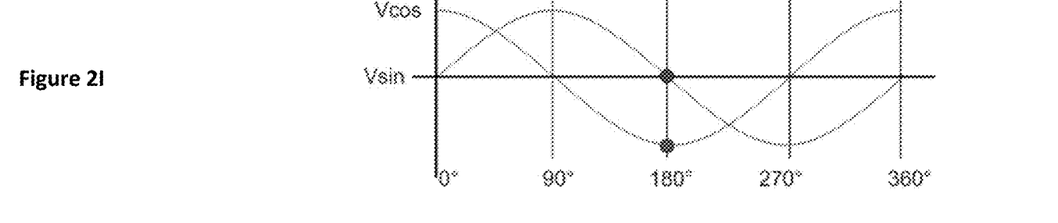

FIGS. 2G, 2H, and 2I illustrate operation of receive coils 110 and 112 with target 124 positioned at the 180° position. As shown in FIG. 2G, loop a receive coil 110 is uncovered by loop b is covered by target 124. Considering the shown currents in the loops, $V_a=-1$ and $V_b=0$. Consequently, $V_{cos}=V_a+V_b=-1$. FIG. 2H illustrates loops c, d, and e where loop e is covered by target 124 and loop d is half covered by target 124. Loops c and the other half of loop d are uncovered by target 124. Consequently, considering the shown currents in the loops, $V_c=½$, $V_d=-1.2$, and $V_e=0$. Consequently, $V_{sin}=V_c+V_d+V_e=0$. This is further illustrated in the graph of $V_{sin}$ and $V_{cos}$ as a function of the position of target 124 illustrated in FIG. 2I.

Figure 3A:
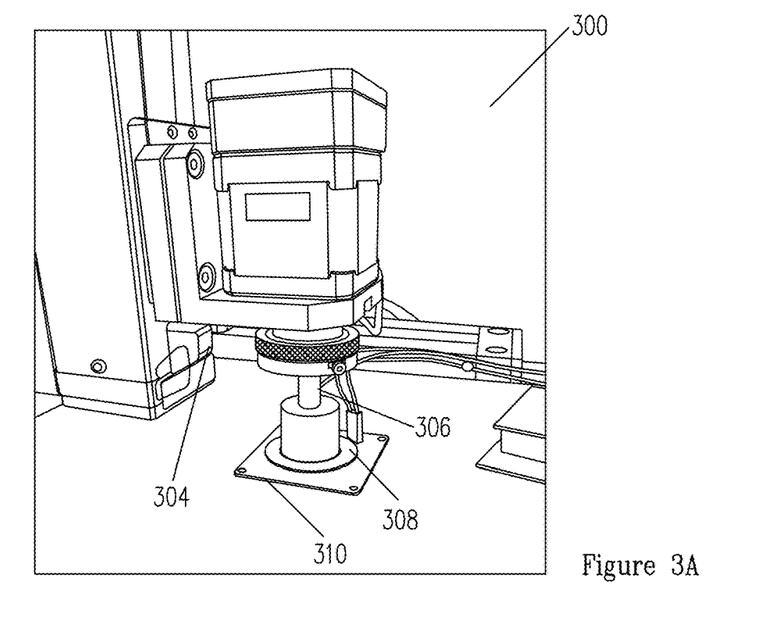
FIGS. 3A and 3B illustrate a test apparatus for testing the accuracy of a position sensor.
Figure 3B:
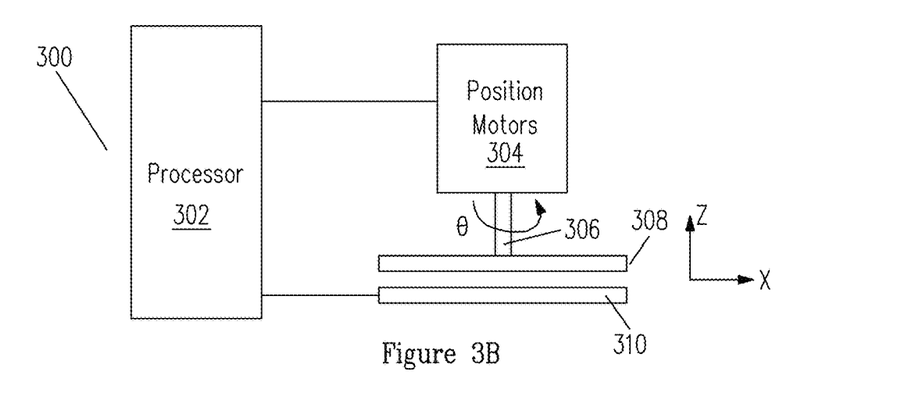
Figure 3C:
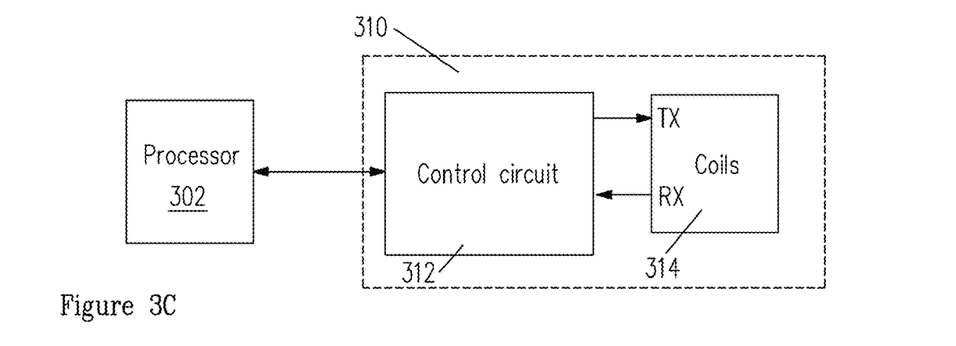
FIG. 3C illustrates illustrate of a processor of the test apparatus with a position sensor.

FIGS. 3A and 3B illustrates a system 300 for measurement and calibration of a position sensor. FIG. 3C illustrates an interaction between system 300 and a position sensor 310 that is being tested. Due to non-idealities of the magnetic coupling principle, a calibration procedure is needed to correct the measured position of the target by the actual position of the target.

FIG. 3B illustrates a block diagram of system 300 as indicated in FIG. 3A. As illustrated in FIG. 3B, a processor 302 is coupled to position motors 304. Position motors 304 are coupled through a connector 306 to a mount 308 on which a target such as target 124 is mounted. Mount 308 is positioned above a position sensor 310. Position sensor 310 is in communication with processor 302 in order to provide positional data of the target on mount 308 with respect to the coils on position sensor 310. As is illustrated in FIG. 3C, position sensor 310 includes a control circuit 312 that is coupled to coils 314. Control circuit 312 is often an IC that is mounted on the same PCB as is coils 314. Coils 314 include the transmit and receive coils as discussed above.

Processor 302 can include a processing unit such as a microprocessor, microcontroller, or other device along with sufficient memory (both volatile and non-volatile) and supporting circuitry (analog-to-digital converters, digital-to-analog converters, support circuitry, etc.) to perform the functions described herein.

Position motors 304 can include a desk with four step motors to have a 4-axis movement control of the target on mount 308. These dimensions include linear x, y, z direction as well as the rotational parameter around an axis through support 306. These motions are illustrated in FIG. 3B, with the Y direction being orthogonal to the X and Z direction shown and the angular rotation θ shown. Consequently, the target mounted on mount 308 can be swept over the top of the receiver coils on coils 314 in position sensor 310 in all possible directions while the precise location of the target is known in processor 302. Further, processor 302 receives the output from control circuit 312 in position sensor 310, which provides the measured position on the position sensor 310 to compare with the precise location data as determined by processor 302. For circular position sensors, the rotational position θ and the air gap z (the distance between the target on mount 308 and the PCB where coils 314 are placed) can be fully monitored. In a linear position sensor, the x-y location of the target along with the air gap z can be monitored.

As discussed previously, control circuit 312 includes processors and support circuitry to interact with coils 314 and provide measured positional data to an external system, as shown in FIG. 3C processor 302.

This system illustrated in FIGS. 3A, 3B, and 3C can be used for measurements, calibration, and linearization. The accuracy of position sensor 310 is defined as the difference between the measurement of the position of the target on mount 308 during a sweep of the target on mount 308 from an initial position to an end position and an expected ideal curve, this result is expressed in percentage of the full-scale measurement.

Figure 4A:
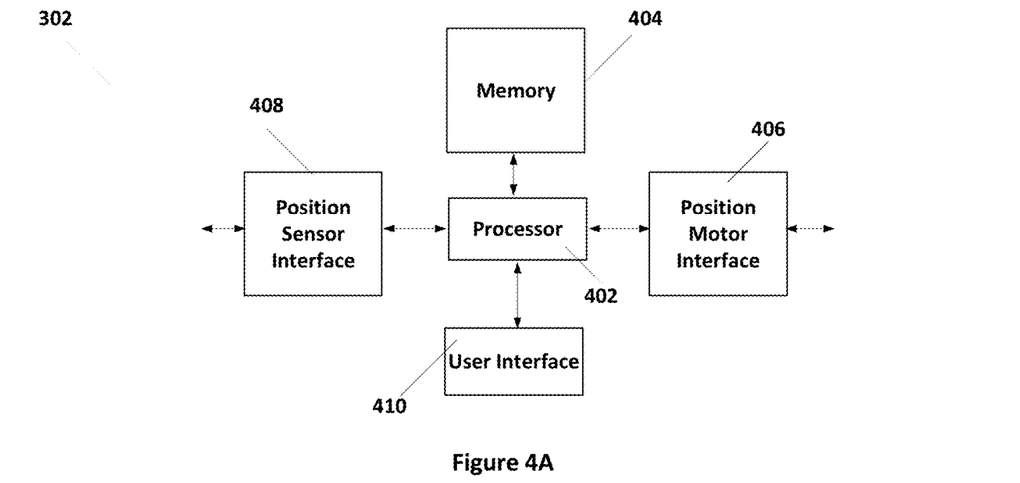
FIG. 4A illustrates an example of a processor of a system as illustrated in FIGS. 3A and 3B.

FIG. 4A further illustrates processor 302 of system 300. Processor 302 can, for example, be a computer that includes a microprocessor, microcomputer, or other computing processor 402 that is couple to a memory 404. Memory 404 includes sufficient volatile and non-volatile memory to store data and instructions that are executable on processor 402 to perform the operations discussed in this disclosure. Processor 402 is further coupled to a position motor interface 406 that can be coupled to control position motors 403 as illustrated in FIG. 3B. Processor 402 is also coupled to a position sensor interface 408 that can be coupled to control circuit 312 of position sensor 310 as illustrated in FIG. 3B. Processor 402 can further be coupled to a user interface 410, which can include keyboards, displays, touchscreens, audio outputs, and other devices to interface with a user of system 300.

Figure 4B:
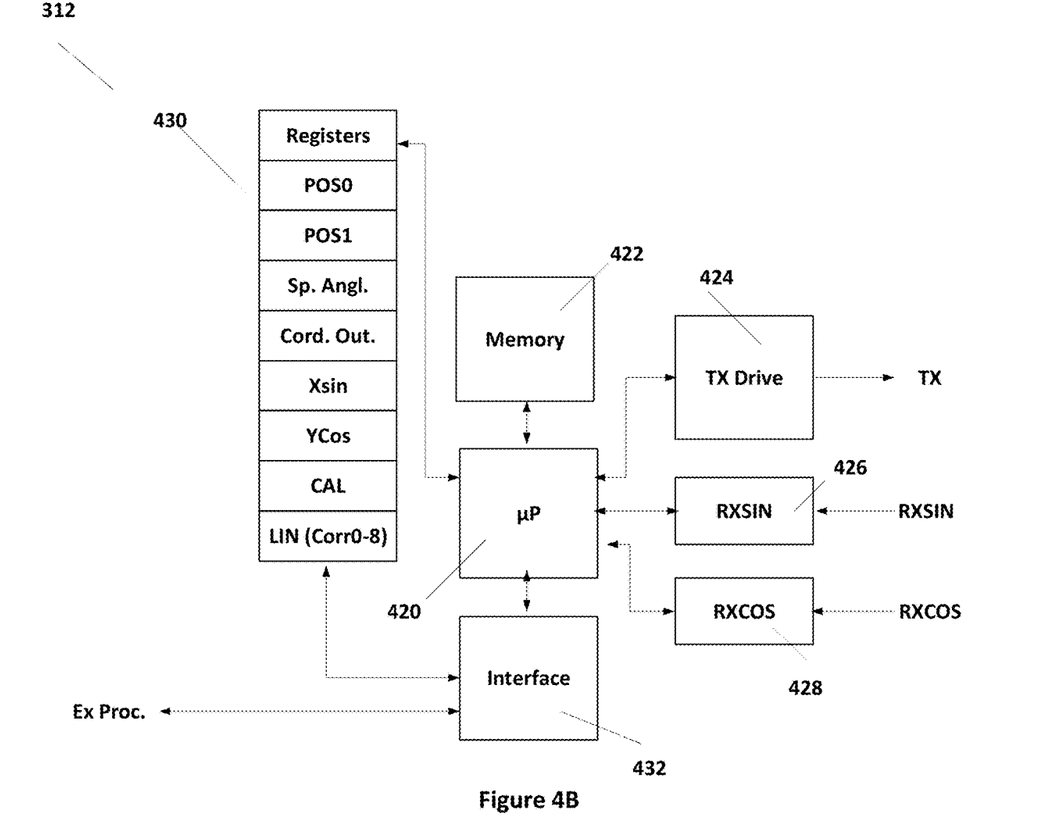
FIG. 4B illustrates a control circuit of a position sensor as illustrated in FIG. 3C.

FIG. 4B further illustrates control circuit 312 of position sensor 310. As discussed above, control circuit 312 can be formed on a single integrated circuit that is mounted on the same PCB on which coils 314 are formed. As illustrated in FIG. 4B, control circuit 312 includes a microprocessor 420. Microprocessor 420 is coupled to a memory 422 and is capable of executing instructions stored in memory 422 for performing the functions discussed in this disclosure. Memory 422 includes sufficient volatile and non-volatile memory for storing executable instructions and data for microprocessor 420 to perform these instructions. Microprocessor 420 is further coupled to a TX drive circuit 424 that drives current through TX coils. Further, microprocessor 420 is coupled to receive data from RX Sin circuit 426 and RX Cos circuit 428. Circuits 426 and 428 include analog processing as well as analog-to-digital converters to supply digital data corresponding to the RX SIN signal from the sine-oriented coils and the RX COS signal from the cosine-oriented coils on coils 314. Further, microprocessor 420 is coupled to registers 430, which is further discussed below. An interface 432 is coupled to microprocessor 420 and to registers 430. Interface 432 interfaces with an external processor such as processor 302 of system 300 illustrated in FIG. 4A.

Registers 430 includes both read/write registers as well as read-only registers that provide data through interface 432 between the external processor and microprocessor 420. In some embodiments, register 430 may be EEPROM on an IC that includes control circuit 312. Registers 430 include a POS0 register that stores the output angle determined by microprocessor 420 after output calibration and a POS1 register that stores the output angle determined by microprocessor 420 after output calibration and linearization. The spatial angle register holds the output angle determined by microprocessor 420 before any calibration or linearization is performed. Microprocessor 420 determines the spatial angle from the raw digital sin data X SIN and cosine data Y COS from the receive coils. XIN and Y COS may also be stored in registers 430. Other registers include calibration registers and linearization registers (Cal and Lin) that may be written to through interface 432 in order the calibration the calculations performed by microprocessor 420 to determine the POS0 and POS1 values from the spatial angle value. Registers 430 may include any number of registers, including any number of calibration registers or linearization registers.

Figure 5A:
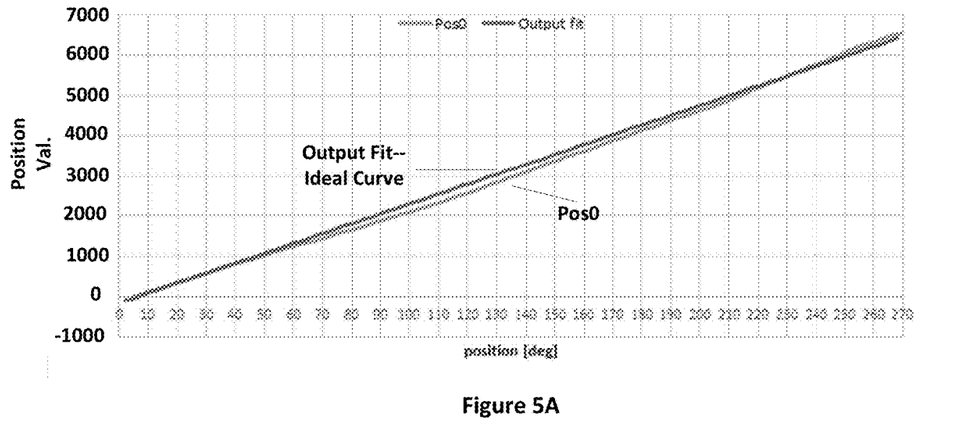
FIG. 5A illustrates an accuracy and output fit of the position as measured.

FIG. 5A illustrates the measured positional value in digitized units versus the actual position in degrees. In FIG. 5A, PosO represents the measured value as supplied by control circuit 312 and measured from a register 430 in control circuit 312 versus the known position as measured by processor 302 in system 300. The Ideal Curve value is the ideal curve using the known position of the target as determined by system 300, which in FIG. 4 is represented by a straight line. The error based on percentage of the fullscale value FS is then given by $$FNL = \frac{100(Pos0 - Ideal_{curve})}{Fs}$$

Figure 5B:
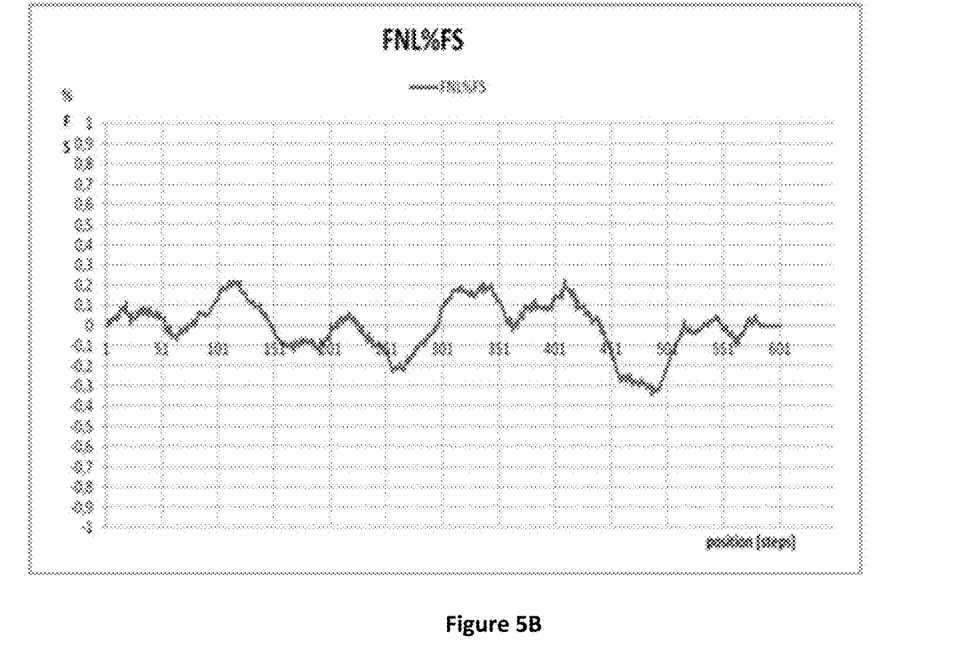
FIG. 5B illustrates the error in the plot in FIG. 5A.

In some cases, PosO is the value measured from a register of control circuit 312. FS is the full-scale value, which for a 16 bit register is $(2^{\wedge}16-1)=65535$. FIG. 5B illustrates the present error in the curve, FNL, as illustrated in FIG. 5A.

As is demonstrated calibration and linearization of position sensors is an important aspect of producing such sensors. This disclosure addresses several aspects of the calibration and linearization methods used in both linear and circular positions sensors, including: (1) Accuracy estimations methods of the positions sensor circuits including inductive coil sensors; (2) Magnitude estimation methods of the position sensor circuit including inductive coil sensors; (3) One-step calibration for the process of linearization and calibration of position sensors; (4) A linearization algorithm for position sensors; and (5) Smart inductor solutions, the future of inductive sensor technology, for position sensors.

Some embodiments provide an accuracy estimation of a sensor design without actual sensor measurements. These accuracy estimates can be performed for every geometry, for different airgaps, for each worse-case target mechanical (x, y, z, tilt) tolerances at a customer module level, for each temperature condition, and for any dynamic (application lifetime) target mechanical (x, y, z, tilt) tolerances at customer module level.

Advantages of such embodiments include that the accuracy can be estimated in the first phase of feasibility analysis. Further, an understanding in real-time of whether or not it is possible to meet customer expectations or application specifications without trial and error. Further, the time to market, design in cycle, PCB manufacturing cost, engineering time for PCB layout, and verification time on the test bench can all be reduced.

An accuracy estimation can be performed by calculating the error from the position sensor control circuit 312, which can be an integrated circuit, for different temperatures. Control circuit 312 circuit may include an analog front end, analog-to-digital converters, digital signal processors, digital-to-analog converters, and other circuits. Further, the error introduced by the measurement setup can be calculated. An error generated by the coils can be provided from a coil simulation tool. A probability approach can be taken for combining the various points of error that have been calculated. Finally, an additional correction factor to the final error number can be provided from a collection of historical data in an internal database and used in error correction.

$$Err\_theoretical = Err\_Coil + Measurement\_Step + circuit\_error +/- Delta\_database$$

In some embodiments, the error data can be included in control circuit 312 or can be calculated, for example, in processor 302 and the results loaded into control circuit 312 to be used when processing data.

Further, a magnitude estimation can be made in the first phase of feasibility of the sensor. Magnitude can be estimated for different geometry, different airgaps, different target geometry, and different number of Tx coil turns. Such a calculation can be used in the feasibility phase of developing a sensor.

Magnitude estimation has several advantages. Estimating the magnitude level of the input signal can be performed in the first phase of feasibility of the project. Further, it can be understood in "real time" if it is possible to meet the customer/application specification without trial and error. The design can be otherwise changed to meet these specifications, including changes to the target, geometry, airgap, number of turns, and other structural changes. Consequently, estimating the magnitude can reduce the cost by reducing the time to market, reducing PCB manufacture, reducing layout engineer time, and reducing the measurement in the test bench.

The magnitude can be made by calculating the amplification in the analog-front-end (formed by RX sin 426 and RX COS 428), AFE_amplif, of the control circuit 312 of position sensor circuit 310, calculating the effective current in transmitter (TX) coil for a given geometry, calculating the receiver voltage Volt_Rx on the receiver (Rx) coils by including the points above in the simulation tool, and then calculating Cordic_Amplitude=AFE_amplif*Volt_RX.

These estimation processes can be used to help design the position sensor to remove some of the design and testing steps of providing a position sensor design. Furthermore, with a particular design, the calibration and linearization procedures can also be improved.

In an inductive position sensor such as that discussed above, it is necessary to Calibrate and Linearize the sensor. As in any other sensor, the process of calibration and linearization(C&L) is very important for the functionality and for the performance of the sensor.

Calibration refers to matching the electrical measured position with the mechanical reference position. Linearization refers to linearization of the measured position, improving the performance of the sensor in terms of error.

The process of (C&L) is very important of the functioning of the position sensor and also is important to the overall cost of the sensor production. In almost all of the applications with position sensors, a calibration and linearization is needed for each module level. The principal reason for this need is usually the mechanical tolerance during the production of the module. The non-repeatability and the mechanical tolerance make it impossible to use the same calibration and linearization parameter for each module. As the C&L is applied at module level, this implies that the time for C&L has an impact on direct cost of each module. Decreasing the time of this process means decreasing the time for production of the resulting position sensors. A theoretical understanding of the position sensor itself has led to different approaches to calibration and linearization.

In the classic calibration method, the standard/old calibration and linearization is accomplished with two or more sweeps of the target in two or more acquisition steps. In total 3 sweeps are necessary to perform a calibration and linearization, where a sweep is defined as target movement over the movement range of the position sensor.

Figure 6A:
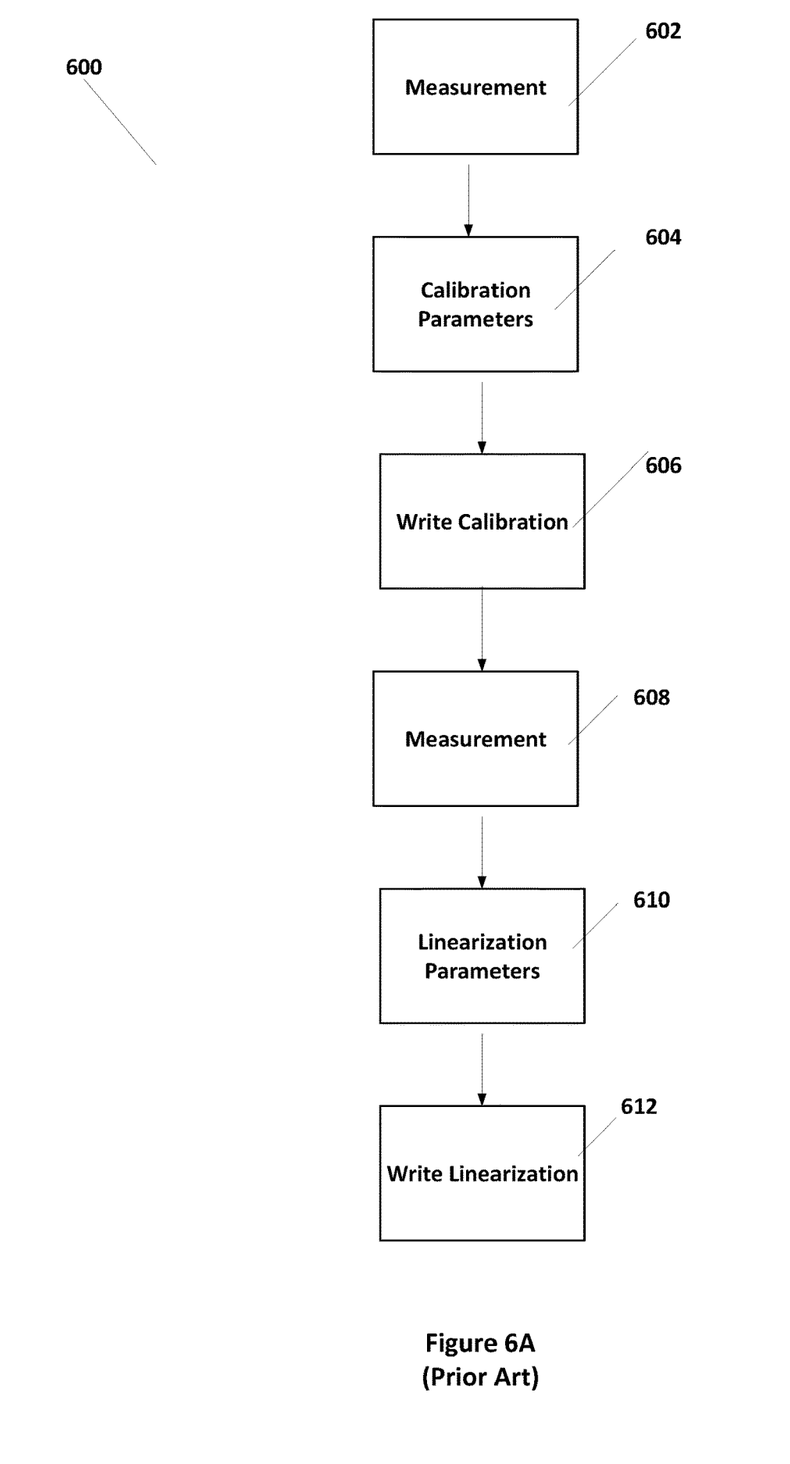
FIG. 6A illustrates a conventional process for performing calibration and linearization.

FIG. 6A illustrates a classic process 600 for calibrating and linearizing a position sensor 310 as is illustrated above. The classic process 600 of C&L, as is illustrated in FIG. 6 includes the following steps: 1) measurement 602 that includes measuring the data, for example with the system 300 shown in FIGS. 3A and 3B; 2) calibration parameter calculation 604 that calculates the calibration parameters from the data measured in measurement 602; 3) write calibration 606 where the calibration parameters are written into position sensor 310, typically using registers 430 as illustrated in FIG. 4B; 4) measurement step 608 where data is measured again using the calibration parameters determined in calibration parameters calculation 604; 5) linearization parameter calculations 610 where the linearization parameters are calculated; and 6) linearization writing 612 where the linearization parameters are writing into position sensor 310.

These steps can be applied to a system such as, for example, position sensor 310 with a control circuit 312 as illustrated in FIG. 4B. In that case, measurement 602 includes reading the Spatial Angle register ("SPA") of registers 430, which is the register of registers 430 that contains the measured value of the position during the sweep of the target across the receive coils. In calibration parameters 604, calculating the calibration parameters includes calculating two parameters: Slope and Zero offset. Slope is calculated by mapping the mechanical movement of the target to the Full-Scale (FS=2^16 with a 16 bit register). For example, Mapping the 20, 30, or 40 mechanical degrees to the full scale of a register in register 430, for example. The zero offset is an offset for matching the electrical signal with the mechanical measurement. In write calibration 606, the calibration parameters (slope and zero offset) are written to control circuit 312, for example into the CAL registers of register 430.

In measurement step 608, measuring of the positional data is done again with the calibration in effect. In measurement step 608, the sweep is done by reading the register Pos0 (Pos0 is register that contain the measured value after calibration during the sweep of the target). In linearization step 610, the linearization parameters are calculated. In some cases, the linearization is implemented by a linear interpolation filter with nine fixed linearization points. The output of the linearization can be read at the register Pos1 of registers 430, which is the position after both calibration and linearization. The output is the difference between the position Pos0 and the correction curve defined from nine points, as is illustrated in FIG. 6B.

Figure 6B:
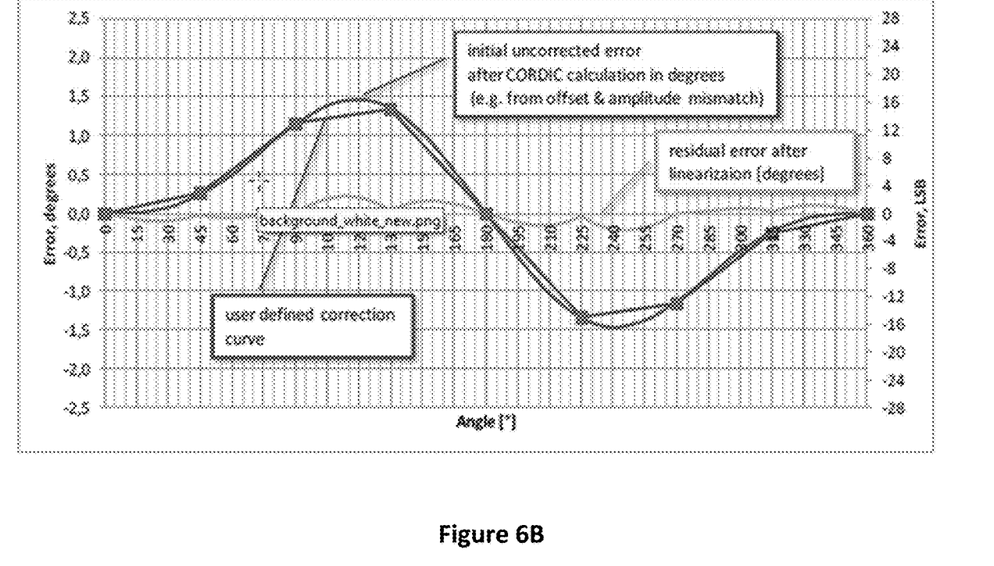
FIG. 6B illustrates an example of error calibration using the process illustrated in FIG. 6A.

As shown in FIG. 6B, the calculation is the difference between the measurement (Pos0) and the ideal line that cross the first and the last point of the POS0 value. The difference is calculated between the nine-fixed point of the ideal curve and the measured value. FIG. 6B, then, illustrates the initial uncorrected error after CORDIC (Coordinate Rotational Digital Compute) calculation performed in control circuit 312 and the correction curve to result in a residual error after correction and linearization.

Figure 6C:
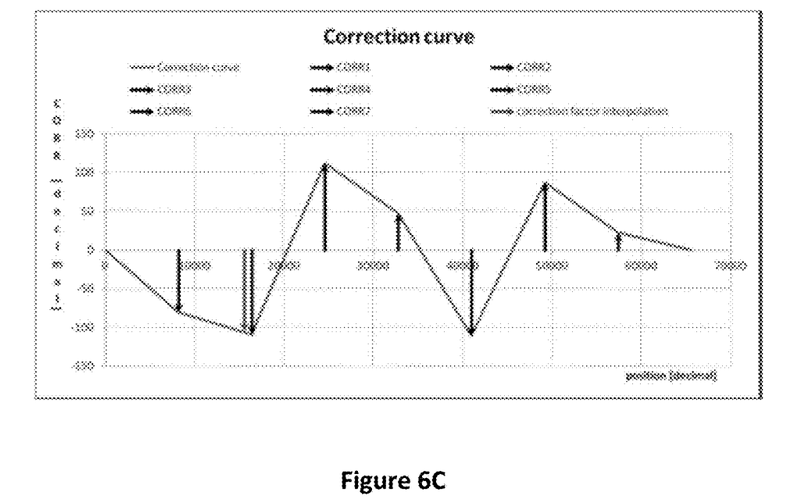
FIG. 6C illustrates an example of a correction curve leading to linearization using the process illustrated in FIG. 6A.

In write linearization 612, the linearization parameters (the nine correction parameters) are written into registers 430 of the control circuit 312. FIG. 6C illustrates the correction curve that is written into the linearization LIN registers of registers 430 in control circuit 312.

In some cases, a Clamping (analog output and PWM) can also be defined in place of the linearization. In many applications, a clamping of the output sensor reading RX SIN and RX COS from coils 314 is used. In a normal operation of the sensor, the output is mapped in a range from % to 95% of the voltage driving control circuit 312, VDDE. In some applications, there is a need to change this range. In almost all of those cases, the range that is needed is from 10% to 90% of VDDE. In these examples, what is needed is a remap of the output signals and not just a cut of the output signals. During the same movement of the target, the range of the output can be mapped to a different output span. The disadvantage is that the resolution will be decreased with the clamping.

The process of clamping is separated into two different sub process: Physical Clamping: that clamps the output level of the output; and Calibration Clamping (determining a slope and a zero offset in a way that for a certain target movement provides a desired output). For a robust solution it is often suggest use of both of these clamping techniques. This clamping process can be performed in place of or in addition to the linearization process represented in FIG. 6A.

In conclusion, the problem is that with two measurements and two writings, the standard method is too slow to be practical in end of line calibration of a position sensor. Consequently, the cost of production will be extremely high to produce a finished position sensor. There is no solution of how to implement a clamping process in the standard calibration process as illustrated in FIG. 6A. In the case when clamping is applied, the values for linearization are missing. As explained in the previous section the linearization is applied in nine-fix point process.

Figure 7A:
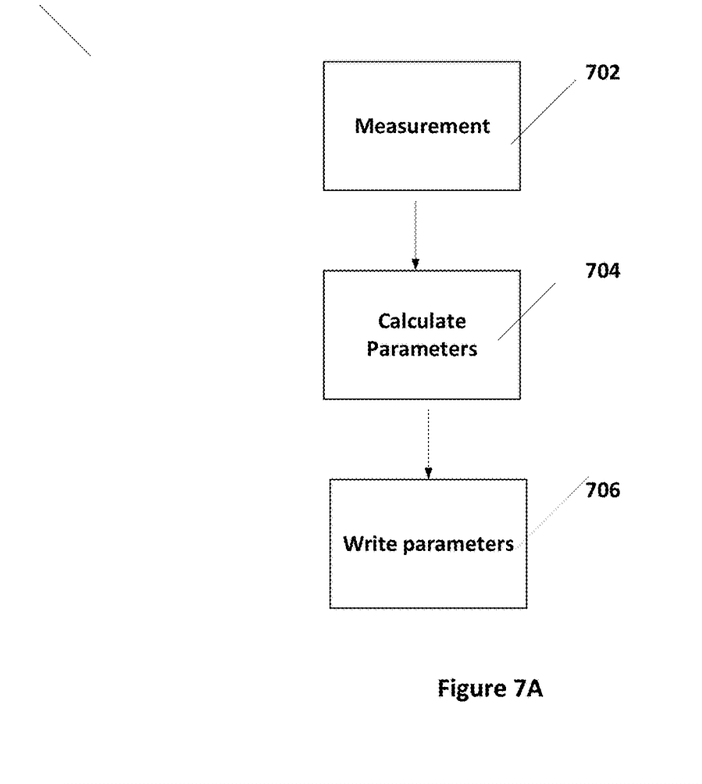
FIG. 7A illustrates a calibration and linearization process according to some embodiments of the present invention.

In contrast, in some embodiments of the present invention only one sweep measurement is necessary to calculate the calibration and linearization factors. A process 700 according to some embodiments of the present invention is illustrated in FIG. 7A. This method can be used with every output interface: Analog, SENT, or PWM. The advantage of embodiments of the present invention is to reduce the test time for calibration and linearization, for example to as low as 2-3 second. It is possible, then, to do a calibration after production for each position sensor 310, which reduces production costs.

FIG. 7A illustrates process 700 for performing the calibration and linearization, which uses only one sweep of the target over coils 314. Process 700 can be performed in system 300 with processor 300 in communication with control circuit 312 of position sensor 310. As illustrated in FIG. 7A, in measurement step 702 system 300 sweeps the target over the coils 314 while reading positional values from registers 430 of control circuit 312. In calculate parameters 704, processor 300 calculates both the calibration and linearization parameters, as is further illustrated below. Additionally, in write step 706, the calibration and linearization parameters are written into the corresponding registers (Cal and Lin) of registers 430 in control circuit 312. Consequently, in accordance with some embodiments, the calibration and linearization process 700 is accomplished in one sweep.

During measure step 702, processor 302 reads the Spatial Angle register of registers 430 at each of the positions of the target. In system 300 therefore, processor 302 steps the target on target mount 308 over position sensor 310 using position motors 304 and, at each step, reads the Spatial Angle register of registers 430. In some systems, processor 302 may read the voltage at an analog output, PWM, or SENT data.

As discussed above, the Spatial Angle data is the position data directly from the CORDIC calculation. In calculate parameters 704, processor 302 determines the calibration parameters and calculates a POS0 value, the position values after applying the calibration parameters, corresponding to the projected values of POS0 for position sensor 310. Consequently, these values do not need to be read again. From the calculated POS0 values, processor 310 can then determine the linearization parameters.

As described, the Spatial Angle value leads to determination of the Pos0 values, which leads to determination of the Pos1 values. As discussed above, the Spatial Angle values are the values from the CORDIC in the position sensor control circuit 310 for each position of target over coils 314. Pos0 is the value after Calibration of the Spatial angle value. Pos1 is the value after linearization of the Pos0 value.

In some embodiments, a new linearization algorithm can be used. The conventional method, as discussed above, uses the difference between the measured value and the ideal one at the fixed points. In some embodiments of the present invention, linearization is based on finding the best correction factor for decreasing the final error. In some embodiments, it is possible to improve the error by 0.2% FS or better with these linearization methods.

In embodiments of this invention, a method for a calibration and linearization that occurs in one step (a very fast method), and which may also include clamping, is presented. There are no known design methodologies in the literature and even a standard solution in commercial position sensor products for this kind of application.

To solve the issues described above with respect to the classic process, a new process was for calibration and linearization is disclosed. As discussed above, the classic process requires a first measurement process, calculating the calibration parameter, writing the calibration parameter, performing a second measurement, calculating the linearization parameter, and writing the linearization parameter. According to embodiments of the present invention, the calibration method includes measuring location data, calculating the calibration and linearization parameters, and writing the parameters to the position sensor, which substantially reduces the calibration and linearization time and cost.

As discussed above, measuring the location data in system 300 includes reading the Spatial Angle register of registers 430 of control circuit 312 at positions of the target over coils 314 as the target is swept over position sensor 310. As discussed above, the actual position of target relative to position sensor 310 is known in processor 310 and the Spatial Angle register reflects the determination by position sensor 310 based on the CORDIC output. From this Spatial Angle data, it is possible to calculate the calibration factors slope and zero offset as discussed above. In accordance with the present invention, the Spatial Angle and the calibration factors can be combined to determine the POS0 data (which is the Spatial Angle data corrected by the Calibration Parameters): POS0=F(Spatial Angle, Calibration Parameters). In some embodiments, POS0=Spatial Angle+Line (Slope, Intercept). In process 700, the POS0 register of register 430 is not read during the sweep, only the Spatial Angle register of register 430 is read.

In embodiments of the current invention, Pos0 is calculated from the Spatial Angle and the Calibration Parameters. The Pos0 value (value of the register in register 430 of control circuit 312 is the value after Calibration has been applied) is calculated from combining the Spatial Angle (SPA), slope and Zero offset as described above. The Pos0 data is calculated using the SPA and not measured, resulting in this approach having one less measurement step in the process.

In accordance with some embodiments of the present invention, linearization uses an iterative algorithm for determining the nine correction factors in a way that the max error calculated is the smaller one with respect to the set of correction factors found during the iterative algorithm. Embodiments of this invention take into account the implementation of the linearization model used in control circuit 312.

The algorithm executed in control circuit 312 to calculate the "POS1" value, which is logically the data after linearization, involves calculating the correction factor based on the POS0 value and an ideal curve crossing the first and the last point. An iterative algorithm can find a set of new correction factors (COR0 through COR8) and in the end will choose the set of correction factors with the smallest worst error. All the algorithms described herein can be implemented in every programming language.

As discussed above, there is an issue when clamping is applied. In the case where a clamping is applied, the values for implementing the linearization algorithm are missing. The linearization is applied in nine-fixed point; the first and the last point are the zero value and the full scale value. Where the clamping is from 10% to 90%, the first fixed point and the last one becomes missing. This implies that the first segment and the last segment of the correction function are not implemented correctly.

According to some embodiments of the present invention, the algorithm determines the first and the last segment by identifying first the desire segment and from the equation of this segment determine the corrections value. This is discussed further below:

With the parameters corr0 and corr8 depicting the first and the last segment, respectively, the correction values can be given by $$\text{Corr}0 = -\frac{X_0}{X_1} * \text{Corr}1$$

$$\text{Corr}8 = -\frac{X_0}{X_1} * \text{Corr}7$$

where $X_0$ is the Pos0 value at 0 position and $X_1$ can be set to a particular value, for example 8192. The same ration value $X_0/X_1$ can be used in Corr8 because the percentage of the clamp is equal to 5% in the beginning and in the end of the output.

Figure 7B:
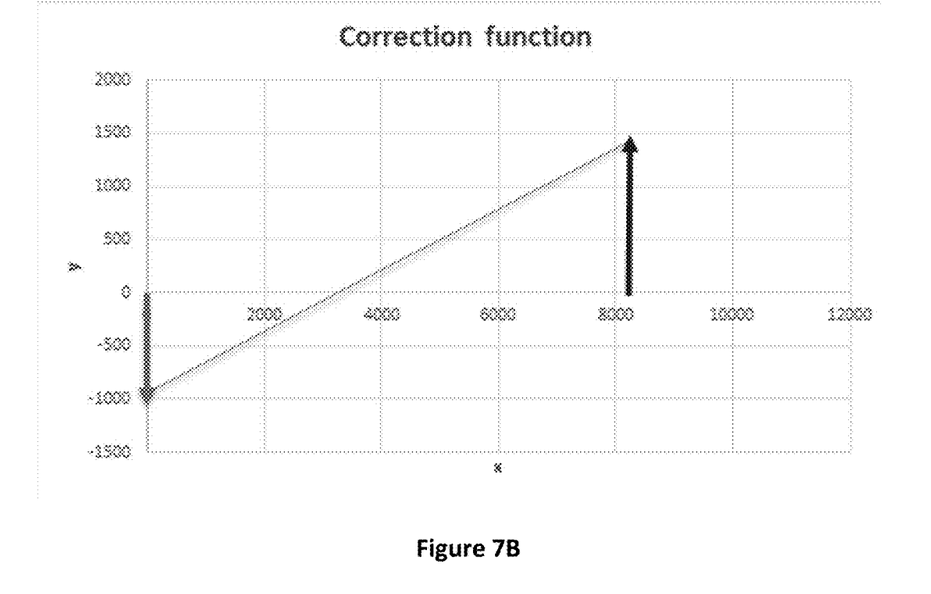
FIG. 7B illustrates a correction function resulting from the calibration and linearization process illustrated in FIG. 7A.

Mathematically, the line equation is determined by two points, for example point A=(8191, 1417) and point B=(3277, 0). The point (8191, 1417) is defined such that 8191 is the fixed correction point and 1417 is the correction factor at this point (which has been calculated as described above). The point (3277, 0) is the correction factor applied at the point 3277. The value 3277 is defined from the Clamping value and should not be changed from the correction factor, this is the reason that the correction should be zero. From these points, the equation for the line y=mx+n can be determined. Corr0 is determined from the line equation as can be seen in the graph in FIG. 7B at x=zero (in this example, Corr0=−1000).

The step-by-step linearization process is further described below. As discussed above, the calibration process yields the zero offset and the slope. The Linearization process yields the linearization corrections Corr0, Corr1, . . . Corr8. There may be several approaches, two of which are outlined below. For the presented approach, the number of samples taken during the measurement phase is such that the greater number the better results of the linearization. For example, more than 400 samples for one complete sweep of the target may be used.

In the conventional approach, which is a two-measurement approach as illustrated in FIG. 6A, the two end points of the Spatial Angle can be read and used for calibration. The calibration can then be written to the position sensor. The Pos0 register value can then be read in a second sweep and that value used for linearization. The linearization correction factor can then be written to the position sensor, for example into the registers of the position sensor.

Embodiments of the present invention use a single measurement, step 702, resulting in one sweep for both linearization and calibration. In this case, processor 302 executing measurement 702 reads the Spatial Angle register value of registers 430 and in calculation step 704 the calibration is accomplished using the two end points. The value Pos0 is then calculated from the Spatial Angle and the Calibration Parameters and linearization is then performed using the calculated Pos0 value. The linearization and calibration parameters are written into the position sensor 310 registers 430 in write step 706. As described above, this approach needs only one measurement (one sweep and that is enough for both linearization and Calibration)

In this new method of calibration and linearization, the Analog Output can be read from control circuit 312 and the values are expressed in volts. The linearization function has been implemented in digital domain and the correction factor are applied at fixed "digital" point. To realize the linearization, a conversion has to be done (From analog to Digital) of the data read from analog output. If the Zero offset function is equal to the origin (zero) and the slope is equal to one this implies that:

Spatial value (row data)=Pos0 (row data)=Pos1 (row data)=Analog output (Volts)

As an example, the EPROM configuration registers 430 is such that Zero offset 0x00=2400, Slope 0x01=0400, and VDDE Supply=5 volt. The analog output (Volts) has to be converted to spatial value (row data). The logic behind this is to use 5% of VDDE to 95% of VDDE (Ratio metric), which results in 0.25 volts to 4.75 volt, and this is mapped to mapped to the digital register 0–($2^{16}$–1). Additionally, 4.75-0.25 V is 4.5 V. Voltage measurements are the values measured at the analog output. The row data is the conversion of the data in a row, or $$\text{Row data} = \frac{(\text{Volt\_meas} - 0.25) * (2^{16} - 1)}{4.5 \text{ V}}$$

This formula is applied to each sample value at the analog output. As a definition, OutputCalPOS0 is the value of the Pos0 register measured or calculated.

Consequently, calibration, or determination of the zero offset and slope, can be determined in a two-point measurement by 1) Reading the spatial angle when the target is in the first position (point A); and 2) Reading the spatial angle when the target is in the last position (point B).

Defining the Mechanical End Points of Sensor as Pt.A and Pt.B, the following algorithm can be used:

If spatial_angle_pt.A<spatial_angle_pt.B
spatial_angle_min=spatial_angle_pt.A
spatial_angle_max=spatial_angle_pt.B
Else
spatial_angle_min=spatial_angle_pt.B
spatial_angle_max=spatial_angle_pt.A The Zero point offset can then be calculated as offset_value=spatial_angle_min. This notation can be mapped to register notation as follows:

If (offset_value<=2^15)

$$\text{offset parameter}=2^{13}+2^{10}*[1-(\text{offset value}/2^{15})]$$

else $$\text{offset parameter}=2^{10}*[(\text{offset value}/2^{15})-1]$$

The offset parameter can then be written to EPROM:
addr. 0x00=dec2hex [offset parameter; 4]
The Slope can be calculated as $$\text{slope value}=2^{16}/(\text{spatial\_angle\_max}-\text{spatial\_angle\_min})$$

$$\text{slope parameter}=2^{10}*\text{slope value}$$

This can be written to an address in the position sensor:
addr. 0x01=dec2hex[slope_parameter; 4]

Optionalally, the slope polarity change of position output can be calculated:

$$\text{offset\_value}=\text{spatial\_angle\_max}$$

$$\text{slope parameter}=2^{12}+2^{10}*\text{slope value}$$

In some embodiments, in a smart inductive sensing (SIS) system, the ideal coil design based on customer requirements can be predicted and the coils produced accordingly.

The above detailed description is provided to illustrate specific embodiments of the present invention and is not intended to be limiting. Numerous variations and modifications within the scope of the present invention are possible. The present invention is set forth in the following claims.

What is claimed is:

1. A method of calibrating and linearization of a position sensor, comprising:
   rotating a target over the position sensor with a position motor to a set of positions, wherein a processor coupled to the position motor determines a location of each of the set of positions from the position motor;
   reading, in the processor that is further coupled to the position sensor, Spatial Angle data from the position sensor at the set of positions of the target as the target is rotated over receive coils in the position sensor by the position motor;
   calculating, in the processor, calibration parameters from the Spatial Angle data;
   determining, in the processor, initial position values from the Spatial Angle data and the calibration parameters;
   determining, in the processor, linearization parameters from the initial position values; and
   writing, with the processor, the calibration parameters and the linearization parameters into the position sensor.

2. The method of claim 1, wherein calculating calibration parameters from the Spatial Angle data includes determining a slope and an intercept from a line connected a first Spatial Angle and a last Spatial Angle.

3. The method of claim 2, wherein determining linearization parameters includes determining a number of correction values at the number of points between the first Spatial Angle and the last Spatial Angle.

4. The method of claim 3, wherein the number of correction values is determined to result in a least worst error of position measurements.

5. The method of claim 1, wherein reading spatial angle data from the position sensor includes reading spatial angle data from a register in the position sensor.

6. The method of claim 1, wherein writing the calibration parameters and the linearization parameters into the position sensor includes writing the calibration parameters and the linearization parameters into calibration and linearization registers in the position sensor.

7. A calibration and linearization system, comprising:
   a processor; and
   a position motor coupled to the processor, the position motor configured to move a target mounted to the position motor over a range of a position sensor positioned relative to the target,
   wherein the processor executes instructions to
      move the target over the position sensor to a set of positions, wherein the processor determines a location of each of the set of positions from the position motor;
      read Spatial Angle data from the position sensor at the set of positions of a target swept over receive coils in the position sensor;
      calculate calibration parameters from the Spatial Angle data;
      determine initial position values from the Spatial Angle data and the calibration parameters;
      determine linearization parameters from the initial position values; and
      write the calibration parameters and the linearization parameters into the position sensor.

8. The system of claim 7, wherein calculating calibration parameters from the Spatial Angle data includes determining a slope and an intercept from a line connected a first Spatial Angle and a last Spatial Angle.

9. The system of claim 8, wherein determining linearization parameters includes determining a number of correction values at the number of points between the first Spatial Angle and the last Spatial Angle.

10. The system of claim 7, wherein the processor is configured to read and write to registers in the position sensor.

11. The system of claim 10, wherein the registers include a Spatial Angle register, calibration parameter registers, and linearization parameter registers.

* * * * *